(12) United States Patent
Alexander

(10) Patent No.: US 11,790,169 B2
(45) Date of Patent: Oct. 17, 2023

(54) METHODS AND SYSTEMS OF ANSWERING FREQUENTLY ASKED QUESTIONS (FAQS)

(71) Applicant: Salesforce, Inc., San Francisco, CA (US)

(72) Inventor: Zachary Alexander, Berkeley, CA (US)

(73) Assignee: Salesforce, Inc., San Francisco, CA (US)

( * ) Notice: Subject to any disclaimer, the term of this patent is extended or adjusted under 35 U.S.C. 154(b) by 152 days.

(21) Appl. No.: 17/221,691

(22) Filed: Apr. 2, 2021

(65) Prior Publication Data

US 2022/0318501 A1 Oct. 6, 2022

(51) Int. Cl.
*G06F 40/279* (2020.01)
*G10L 15/06* (2013.01)
*G10L 15/22* (2006.01)

(52) U.S. Cl.
CPC .......... *G06F 40/279* (2020.01); *G10L 15/063* (2013.01); *G10L 15/22* (2013.01)

(58) Field of Classification Search
CPC ...... G10L 15/063; G10L 15/22; G06F 40/279
See application file for complete search history.

(56) References Cited

U.S. PATENT DOCUMENTS

| | | | |
|---|---|---|---|
| 7,730,478 B2 | 6/2010 | Weissman | |
| 8,731,929 B2 * | 5/2014 | Kennewick | ......... G10L 15/1822 704/270.1 |
| 10,552,432 B2 | 2/2020 | Geh et al. | |
| 10,565,265 B2 | 2/2020 | Rickard et al. | |
| 10,762,903 B1 * | 9/2020 | Kahan | ...................... G10L 15/26 |
| 10,803,127 B2 | 10/2020 | Alexander et al. | |
| 10,853,577 B2 | 12/2020 | Alexander et al. | |
| 11,379,671 B2 | 7/2022 | Alexander et al. | |
| 2017/0351401 A1 | 12/2017 | Pascale et al. | |
| 2018/0089585 A1 | 3/2018 | Rickard et al. | |
| 2018/0096250 A1 | 4/2018 | Rickard et al. | |
| 2018/0096372 A1 | 4/2018 | Rickard, Jr. et al. | |
| 2020/0097496 A1 | 3/2020 | Alexander et al. | |
| 2020/0097563 A1 | 3/2020 | Alexander et al. | |
| 2020/0097616 A1 * | 3/2020 | Asur | ..................... G06F 40/295 |
| 2020/0097809 A1 | 3/2020 | Velasco et al. | |

(Continued)

FOREIGN PATENT DOCUMENTS

| | | | | |
|---|---|---|---|---|
| WO | WO-2019082630 A1 * | 5/2019 | ............... | G06F 3/01 |
| WO | WO-2021050170 A1 * | 3/2021 | ............. | G06F 40/30 |
| WO | WO-2022251472 A1 * | 12/2022 | ............. | G10L 15/24 |

*Primary Examiner* — Mohammad K Islam
(74) *Attorney, Agent, or Firm* — Nicholson, De Vos, Webster & Elliott, LLP

(57) ABSTRACT

Methods and systems for answering frequently asked questions are described. An utterance is received. A decision score that is indicative of the likelihood that the utterance is answerable according to a set of frequently asked questions and associated answers is determined for the utterance. A candidate answer from the associated answers and a selection score for the candidate answer are determined for the utterance. A total score for the candidate answer is determined based on the decision score and the selection score. The total score is indicative of the likelihood that the candidate answer is a correct answer for the utterance according to the set of frequently asked questions and associated answers.

15 Claims, 6 Drawing Sheets

(56) References Cited

U.S. PATENT DOCUMENTS

| | | |
|---|---|---|
| 2020/0117671 A1 | 4/2020 | Govindarajan et al. |
| 2021/0149921 A1 | 5/2021 | Alexander et al. |
| 2021/0149949 A1 | 5/2021 | Alexander et al. |
| 2021/0149964 A1 | 5/2021 | Wang et al. |
| 2021/0150144 A1 | 5/2021 | Kale et al. |
| 2022/0230626 A1* | 7/2022 | Duffy .................... G16H 50/30 |
| 2022/0293094 A1 | 9/2022 | Mao et al. |
| 2022/0318669 A1 | 10/2022 | Alexander et al. |

* cited by examiner

METHODS AND SYSTEMS OF ANSWERING FREQUENTLY ASKED QUESTIONS (FAQS)

TECHNICAL FIELD

One or more implementations relate to the field of natural language understanding (NLU); and more specifically, to the methods and systems of answering frequently asked questions.

BACKGROUND ART

A chatbot, derived from "chat robot," is a computer system that simulates human conversation, either via voice or text communication. Today, such systems can be customized and used in a variety of ways. These include: chatbots that communicate via smart speakers, chatbots that function on smart home devices, chatbots that function via chat and messaging platforms, etc. In addition to having a conversation with a person (such as a sales rep or a support agent, for instance), people can interact with software that helps find answers fast. Whether through typing or talking, a chatbot can connect with a customer. Chatbots can influence a customer relationship by responding to requests faster than a human With the potential for delivering instant responses around the clock, chatbots can also free up customer support teams to apply their emotional intelligence to more complex queries. For example, a chatbot can be used to provide an answer to a customer for frequently asked questions (FAQ).

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

Figure 1:
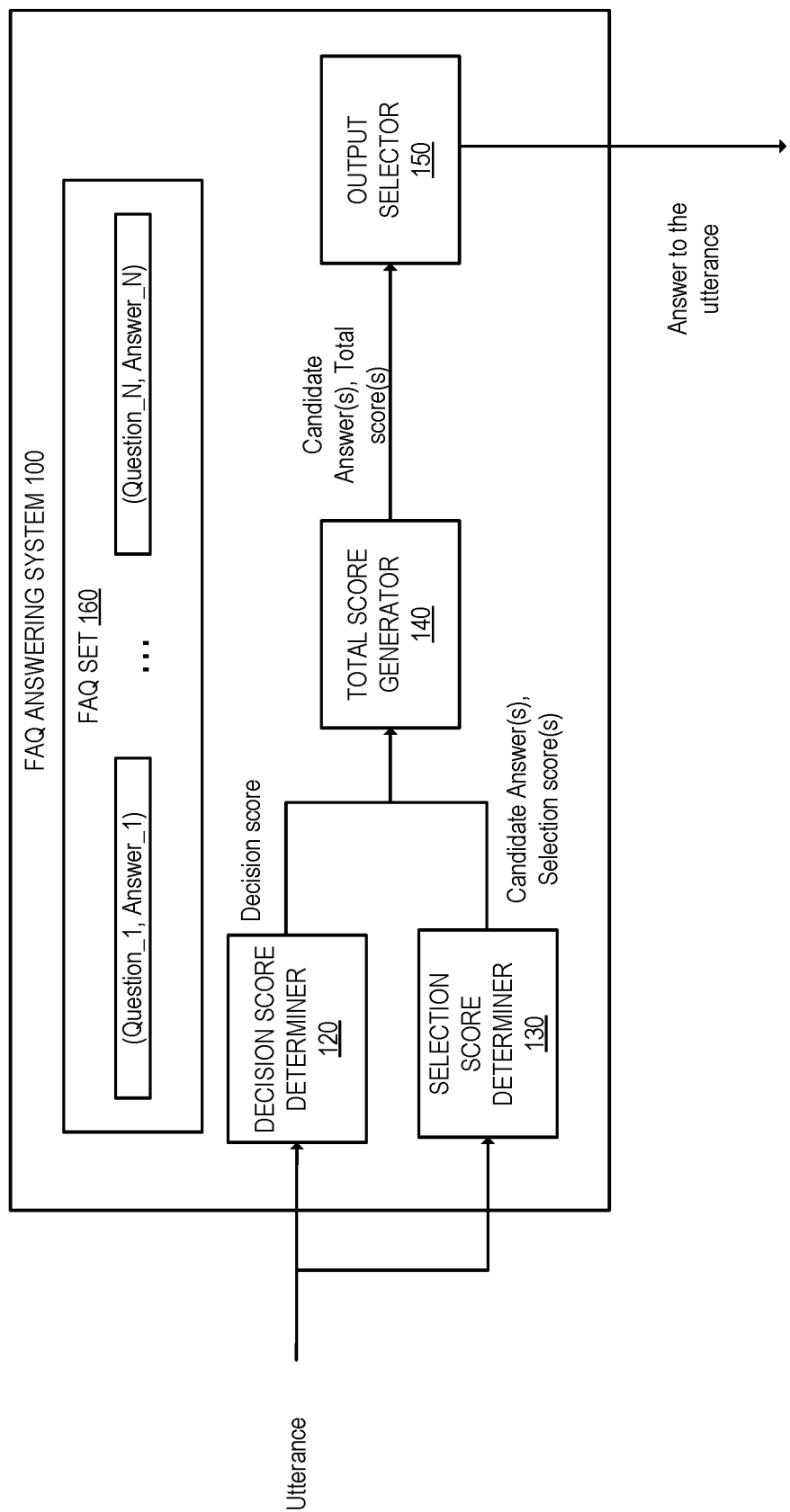
FIG. 1 is a block diagram illustrating a FAQ answering system, according to some example implementations.

The following description describes methods and apparatus for answering frequently asked questions.

A chatbot system can include an answering system for frequently asked questions. A FAQ answering system is a system that includes a set of frequently asked questions and answers (herein referred to as a FAQ set). The FAQ set includes a set of questions and answers, where for each question from the set of questions there is an associated answer from the associated answers. The system is operative to receive from a user an utterance that represents a question and to select from the answers of the FAQ set a candidate answer for the utterance.

Some FAQ answering systems can be implemented based on semantic similarity models for binary classification. In these systems, known semantic embedding models can be used. In such systems, an utterance is input and a vector for the utterance is output, where similar utterances will have the similar vector. The vector of the utterance is compared with vectors of the questions from the FAQ set. The system computes similarity scores that indicate the level of similarity between the input utterance and each of the multiple questions of the FAQ set. The system identifies the question with the highest score and compares this highest score with a threshold. When the highest score is greater than the threshold, the system determines that the utterance is similar to the question and presents the answer associated with the most similar question to the user. When the highest score is not greater than the threshold, the system determines that the utterance does not have an answer according to the FAQ set. However, these systems do not account for ambiguity between answers. For example, when two questions from the FAQ set both receive a high semantic similarity score, the system cannot distinguish between the two and cannot select an answer from the FAQ set.

Some FAQ answering systems can be implemented based on a multi-class classification model. Multi-class classification FAQ systems need a large set of training data for training the model. These systems require multiple examples of each question and do not account for out-of-domain utterances, i.e., the system always assumes that the input utterance is one of the questions of the FAQ set, which is often not the case. Systems that rely on a multi-class classification model or on a semantic similarity model for implementing a FAQ answering system use different features and need to be considered individually.

The implementations presented herein relate to an improved FAQ answering system. The FAQ answering system can be used in a chatbot for responding to questions from a user. In a FAQ answering system, a user enters an utterance, and the FAQ system provides an answer to the question from a set of answers that are associated with known questions from the FAQ set. The implementations herein present a FAQ system implemented based on two machine learning models. The system includes a selection model and a decision model. The selection model is operative to receive the utterance and output an answer with a selection score. The selection model assumes that the utterance is answerable in the system. The decision model is operative to receive the utterance and to output a decision score that is indicative of a likelihood that the utterance is answerable by the FAQ system. The selection score and the decision score are combined to obtain a total score for the answer and the utterance. The total score is indicative of the likelihood that the output answer is the correct answer to the question of the utterance.

In one implementation, an utterance is received. A decision score that is indicative of the likelihood that the utterance is answerable according to a set of frequently asked questions and associated answers is determined for the utterance. A candidate answer from the associated answers and a selection score for the candidate answer are determined for the utterance. A total score for the candidate answer is determined based on the decision score and the selection score. The total score is indicative of the likelihood that the candidate answer is a correct answer for the utterance according to the set of frequently asked questions and associated answers.

Implementations presented can further allow a customer of a multi-tenant system to select a set of FAQs. A decision model and a selection model are adapted to operate according to the selected set of FAQs. The FAQ system is adaptable to the selected FAQ set. In one example, a customer of the multi-tenant system can select a FAQ set for a particular field and/or application. Different FAQ sets can be used for different fields of application, and/or for different applications. Different FAQ sets can be used for different tenants.

FIG. 1 is a block diagram illustrating a FAQ answering system 100, according to some example implementations. The FAQ answering system 100 includes a decision score determiner 120, a selection score determiner 130, a total score generator 140, and an output selector 150. The FAQ answering system 100 can be part of a chatbot application used to communicate with a user. The FAQ answering system 100 includes a FAQ set 160. The FAQ set 160 includes a set of questions and a set of associated answers. For each question from the set of questions, e.g., question_1, there is an associated answer from the set of answers, e.g., answer_1. In some implementations, the set of questions are the most frequent inquiries that a user can make. The FAQ answering system 100 enables the chatbot to answer the user's inquiries without involving a customer service person.

The FAQ answering system 100 is operative to receive an utterance and output an answer for the utterance. An utterance is received from a user through a user interface of a user device. For example, the user of a web-service or an application can enter the utterance when interacting with a chatbot (voice or text chatbot). The utterance can be a sound or text (e.g., a string of one or more characters). The user may use hardware devices such as microphone, a mouse, a keyboard, or any other I/O devices to input the utterance. The utterance is a representation of a question. While implementations herein will be described with respect to the utterance being received from a user, in some implementations, the utterance can be received from another cloud service that is communicatively coupled with the FAQ answering system 100.

The term "user" is a generic term referring to an entity (e.g., an individual person) using a system and/or service. In some implementations, the FAQ answering system 100 is implemented in a multi-tenant architecture. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

The FAQ answering system 100 is operative to return a probability that an answer aj from the FAQ set answers the user's question posed by the input utterance. This probability is a joint probability that the utterance is answerable from the FAQ set and that the answer a_j answers the user's question posed by the input utterance assuming that the utterance is answerable according to the FAQ set. The probability that the answer aj from the FAQ set answers the user's question posed by the input utterance is represented by the equation (1) below:

$$P(a\_j|u) = P(a\_j, u \in FAQ | u) = P(a\_j | u \in FAQ, u) P(u \in FAQ | u)$$

The utterance is input to the decision score determiner 120 and the selection score determiner 130. The decision score determiner 120 is operative to determine a decision score for the utterance. The decision score is indicative of the likelihood that the utterance is answerable according to the FAQ set (i.e., the probability that the utterance is answerable according to the FAQ set). In some implementations, the decision score determiner 120 determines a decision score for the utterance by 1) determining a similarity score for the utterance and a question from the FAQ set, and 2) converting the similarity score into the decision score according to one or more thresholds. In some implementations, the determination of the similarity score can include determining multiple similarity scores for the utterance and the multiple questions of the FAQ set and selecting one of the similarity scores. A similarity score for an utterance and a question from the FAQ set is a measure of how semantically equivalent the utterance is to the question from the FAQ set. The decision score determiner 120 converts the similarity score into the decision score. In some implementations, the conversion is performed according to an exemplary probability distribution of FIG. 2.

Figure 2:
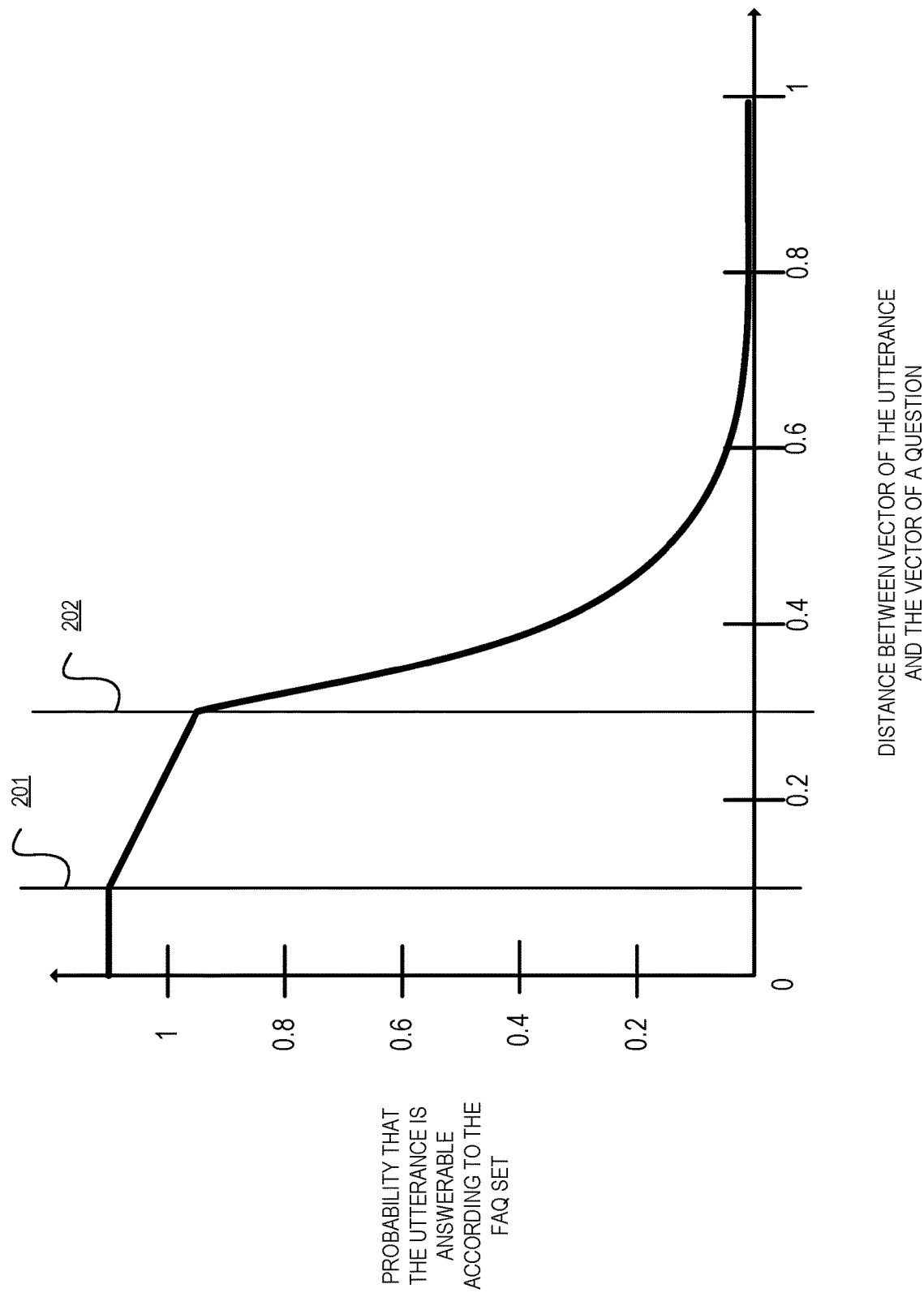
FIG. 2 illustrates an exemplary probability distribution that can be used for converting a similarity score between an utterance and a question from the FAQ set into a decision score for the utterance, in accordance with some implementations.

FIG. 2 illustrates an exemplary probability distribution that can be used for converting a similarity score between an utterance and a question from the FAQ set into a decision score for the utterance, in accordance with some implementations. FIG. 2 illustrates a coordinate system where the x-axis represents the distance between a vector of an utterance and a vector of a question, and the y-axis represents the probability that the utterance is answerable according to the FAQ set 160, i.e., the probability that the utterance can be answered by an answer from the FAQ set 160. In the description herein u represents a vector for the utterance, and q the vector for the question. The vector is a representation of the utterance such that representations of two utterances that are semantically similar (i.e., have similar meanings) are close to one another according to a distance between vectors. The decision score determiner computes the distance between the vector of the utterance and the vector of the question d(u,q) and converts the distance into a decision score according to the distribution of FIG. 2. In the following description a distance between the vector of the utterance and the vector of the question is also referred to as a distance between the utterance and the question.

When the distance between the utterance and the question is less than a first threshold 201, e.g., threshold 201=0.1, $d(u,q)<0.1$, then the utterance u and the question q are equivalent and the probability that u is answerable by the FAQ set is 1. When the distance between the utterance and the question, $d(u,q)$, is between the first threshold 201 and the second threshold 203 (e.g., the first threshold is 0.1 and the second threshold is 0.3), the probability that the utterance u is answerable according to the FAQ set, linearly decreases to about 0.75. When the distance between the utterance u and the question q is greater than the second threshold 202, the probability of equivalence drops exponentially towards 0. In the example of FIG. 2, the conversion of the similarity score, i.e., the distance between utterance and the question $d(u,q)$, and the decision score is such that 1) when $d(u,q)$ is less than the first threshold, the decision score is 1, 2) when $d(u,q)$ is between the first and the second threshold, a decision score is determined according a linear function that decreases from 1 to 0.75, and 3) when $d(u,q)$ is greater than the second threshold, a decision score is determined according an exponential function that decreases from 0.75. In another exemplary implementation, the distribution can be such that the probability of an utterance being answerable is 1 when the distance between the utterance and the question q is less than a predetermined threshold, and 0 otherwise. In this example, the decision score is a step function that depends on the predetermined threshold. The decision score is 1 when the distance between the utterance and the question is less than the threshold and 0 otherwise. In some implementations, the determination of the decision score can be performed as described in further detail with reference to FIG. 3B.

Referring back to FIG. 1, the selection score determiner 130 is operative to receive the utterance and determine one or more candidate answers for the utterance and associated selection scores for the candidate answers. The selection score determiner assumes that the utterance has an answer from the FAQ set and is operative to determine one or more candidate answers choose the best answer for the utterance and their associated selection scores. A selection score for an answer from the FAQ and the utterance is indicative of a likelihood (probability) that the answer answers the question posed by the utterance assuming that the utterance is answerable according to the FAQ. In some implementations, the machine learning model is a multi-class classification model that includes the associated answers as classification classes and outputs one or more of the answers for the utterance with respective one or more associated selection scores. In some implementations, the machine learning model outputs a single candidate answer from the FAQ set for the utterance. In other implementations, the machine learning model outputs more than one candidate answers for the utterance. The operations of the selection score determiner 130 can be performed as described in further detail with respect to FIG. 3A.

The total score generator 140 is operative to receive one or multiple candidate answers and associated selection scores, and a decision score for the utterance. The total score generator 140 calculates for a candidate answer a total score based on the selection score of the candidate answer and the decision score for the utterance. The total score generator 140 multiplies the decision score for the utterance with the selection score of the candidate answer to obtain a total score for the candidate answer and the utterance. The total score is indicative of the likelihood that the candidate answer is a correct answer for the utterance according to the FAQ set. In some implementations, the total score generator 140 can determine total scores for multiple candidate answers.

The candidate answer(s) and the associated total score(s) are input to the output selector 150. The output selector is operative to transmit an answer to the user for the utterance. In some implementations, the candidate answer is output as an answer to the question from the user in response to determining that the total score satisfies a threshold. In one example, the candidate answer is output when the total score is greater than a predetermined threshold. In another example, the candidate answer is output when the total score is less than a predetermined threshold. In some implementations, the candidate answer and the total score are output.

The operations in the flow diagrams are described with reference to the exemplary implementations in the FIGS. 1-2. However, the operations of the flow diagrams can be performed by implementations other than those discussed with reference to FIGS. 1-2, and the implementations discussed with reference to these other figures can perform operations different than those discussed with reference to the flow diagrams.

Figure 3A:
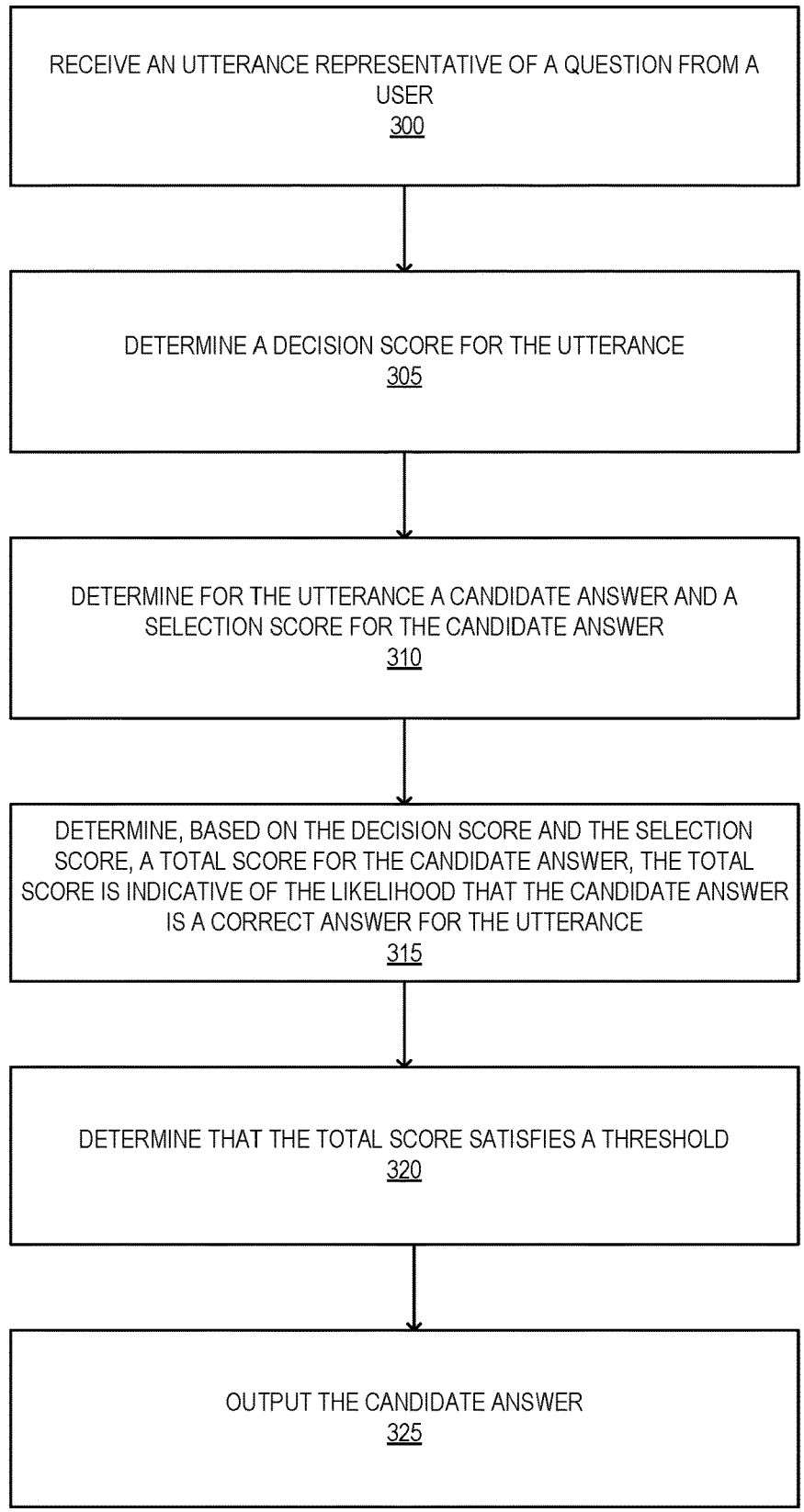
FIG. 3A illustrates a flow diagram of exemplary operations in a FAQ answering system, in accordance with some implementations.

FIG. 3A illustrates a flow diagram of exemplary operations in a FAQ answering system, in accordance with some implementations. The operations of FIG. 3A can be performed by a FAQ answering system, such as FAQ answering system 100.

At operation 300, an utterance is received from a user. An utterance is received from a user through a user interface of a user device. In some implementations, the utterance is received from the user as described above.

At operation 305, the FAQ answering system 10 determines a decision score for the utterance that is indicative of the likelihood that the utterance is answerable according to a set of frequently asked questions and associated answers. In some implementations, the determination of the decision score is performed as described with reference to FIG. 3B.

At operation 310, the FAQ answering system 100 determines for the utterance a candidate answer from the associated answers and a selection score for the candidate answer.

In some implementations, the determination of a similarity score is performed based on a machine learning model that takes an utterance as an input and outputs one or more candidate answers for the utterance based on a similarity score between the utterance and each question of the FAQ set. In some implementations, the machine learning model is a multi-class classification model that includes the associated answers as classification classes and can output one or more of the answers for the utterance with an associated score. In some implementations, the machine learning model outputs a single candidate answer from the FAQ set for the utterance. The candidate answer has the highest similarity score for the utterance from the similarity scores of the other answers in the FAQ set.

In some implementations, the multi-class classification model is trained based on a curated FAQ set that includes one answer for each question from the set. In some implementations, the multi-class classification model is trained based on a training data set that includes noisy versions of the questions and noisy versions of the answers from the FAQ set. In some implementations, the multi-class classification model can be updated through a retraining process based on a training data set that is increased and/or changed over time. For example, the training data set can be increased through a tenant adding exemplary questions, or the FAQ system collecting feedback regarding the performed prediction (i.e., answers provided to utterances received from the user).

In other implementations, the determination of a similarity score is based on a semantic similarity model. In these implementations, the FAQ system 100 determines a vector for the utterance. The vector of the utterance is compared with vectors of the questions from the FAQ set. The system computes distances between the vector of the utterance and the vectors of the questions from the FAQ set. The FAQ system selects one or more questions from the set of questions based on the distances. In one example, the FAQ system can select the question from the set of questions that has the smallest distance with the utterance. In another example, the FAQ system can select multiple questions. In some examples, the FAQ system can select a number N (e.g., N=2, 3, etc.) of questions from the set of questions based on their similarity scores.

At operation 315, the FAQ answering system 100 determines, based on the decision score and the selection score, a total score for the candidate answer. The total score is indicative of the likelihood that the candidate answer is a correct answer for the utterance according to the set of frequently asked questions and associated answers. In some implementations, determining the total score includes multiplying the decision score for the candidate answer with the selection score of the candidate answer.

Figure 3B:
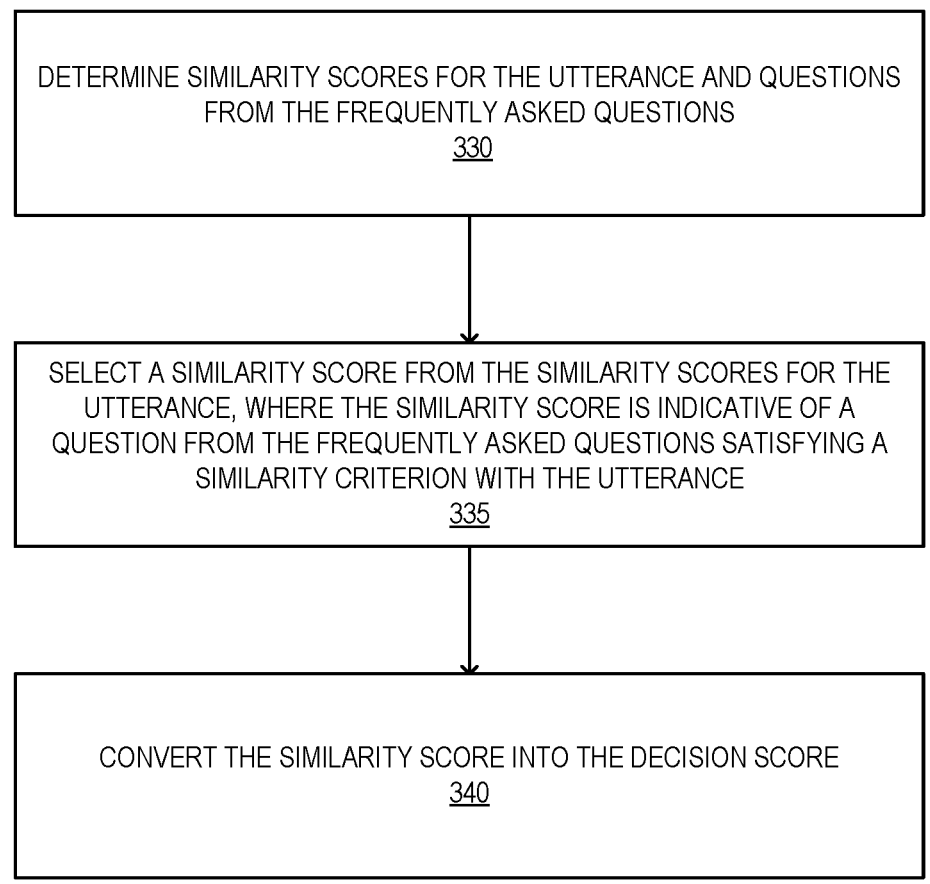
FIG. 3B illustrates a flow diagram of exemplary operations that can be performed for determining a decision score according to some implementations.

FIG. 3B illustrates a flow diagram of exemplary operations that can be performed for determining a decision score according to some implementations.

At operation 330, the FAQ answering system 100 determines one or more similarity scores for the utterance and one or more questions from the frequently asked questions. A similarity score for an utterance and a question from the FAQ set is a measure of how semantically equivalent the utterance is to the question from the FAQ set. In some implementations, the FAQ system 100 determines a vector for the utterance and a vector for the question. The vector is a representation of the utterance. The FAQ system 100 calculates a distance between the vector of the utterance and the vector of the question. The similarity score for an utterance and a question from the FAQ set is determined based on the distance between a vector of the utterance and a vector of the question. In some implementations, the distance between the vectors is 1-cosine similarity. The cosine similarity is the inner product of the same vectors normalized to both have length 1. The FAQ system 100 computes the distance between the utterance's vector and the vector of each of the questions from the FAQ set to obtain multiple similarity scores. Each of the similarity scores for the utterance and the questions indicate the level of similarity between the input utterance and each of the multiple questions of the FAQ set.

At operation 335, a similarity score from the multiple similarity scores is selected. The selected similarity score is indicative of a question from the FAQ set that satisfies a similarity criterion with the utterance. In some embodiments, the similarity criterion can include that the distance between the vector of the utterance and the vector of the question is less than a predetermined threshold. Alternatively or additionally, the similarity criterion can include that the distance between the vector of the utterance and the vector of the question is smaller than all other distances between the vector of the utterances and vectors of the other questions from the FAQ set. In some embodiments, the similarity criterion can include that the similarity score between the utterance and the question is greater than a predetermined threshold. Alternatively or additionally, the similarity criterion can include that the similarity score between the utterance and the question is smaller than all other distances between the vector of the utterances and vectors of the other questions from the FAQ set. The question that is associated with the selected score can be the same or different from the candidate answer for the utterance determined at operation 310.

At operation 340, the FAQ system 100 converts the similarity score into the decision score. In some implementations, the conversion of the similarity score into the decision score is performed based on one or multiple thresholds. When the similarity score satisfies a threshold, the similarity score is converted into a probability associated with the threshold. In some implementations, the conversion of the similarity score into the decision score for the utterance is performed according to a probability distribution that associates for each distance d(u,q) between the vector of the utterance and the vector of the question a probability that u is answerable according to the FAQ set. In one implementation, the conversion of the similarity score into the decision score is performed according to the distribution illustrated in FIG. 2, where a first threshold 201 and a second threshold 202 are used. While implementations herein are described according to the distribution of FIG. 2, in other implementations different distributions and/or thresholds can be used without departing from the scope of the implementations herein.

Figure 3C:
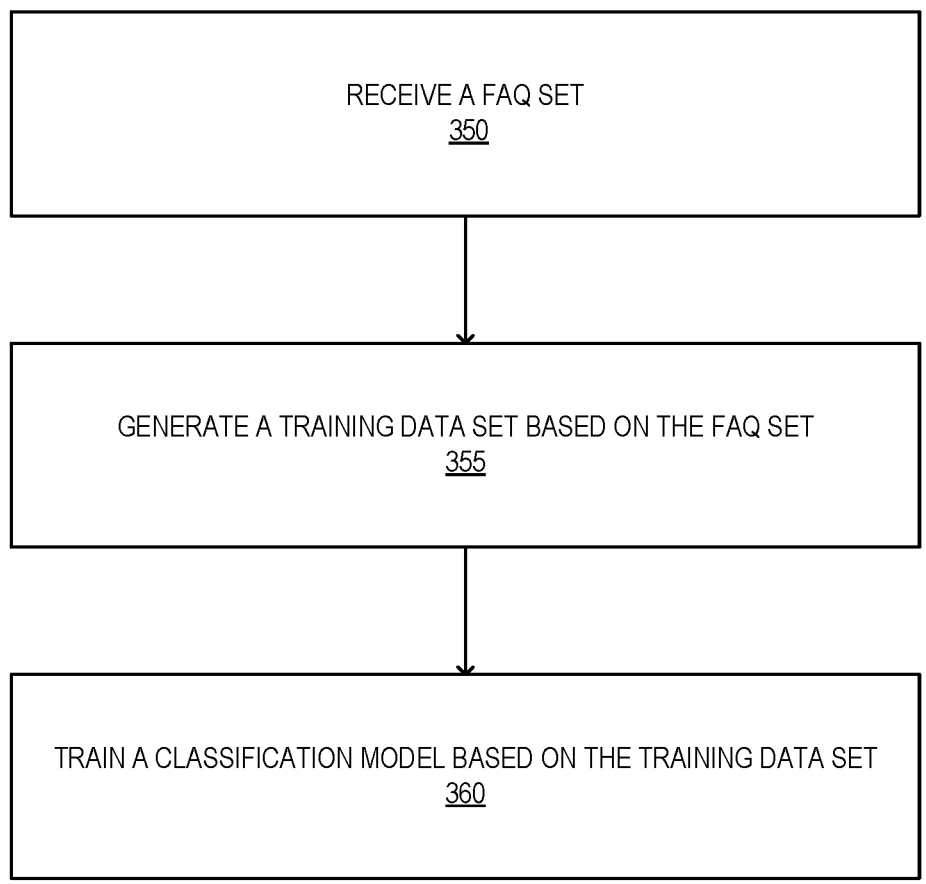
FIG. 3C illustrates a flow diagram of exemplary operations that can be performed for generating a FAQ system that is adapted to a new FAQ set, in accordance with some implementations.

FIG. 3C illustrates a flow diagram of exemplary operations that can be performed for generating a FAQ system that is adapted to a new FAQ set, in accordance with some implementations. A tenant of the FAQ answering system 100 can update the FAQ set over time. In some implementations, the FAQ answering system can receive feedback from the user for answers provided to utterances input from the user. The feedback can cause an existing training data set to be increased by adding the utterance and the associated answer. In another example, a new FAQ set is provided. The new FAQ set can be for a different field, for a different tenant, or for a different application.

At operation 350, the FAQ set is received. The FAQ set includes questions and associated answers. At operation 355, a training data set is generated based on the FAQ set. In some implementations, the training data set includes pairs of noisy versions of the questions with noisy versions of the answers. The noisy versions of questions and answers are generated from the pairs of questions and answers. For example, a noisy version of a question can be generated by removing one or more tokens from the question according to some probability and/or permuting two or more tokens in the question with some probability. Similarly, a noisy version of an answer can be generated by removing one or more tokens from the question according to some probability and/or permuting two or more tokens in the question with some probability.

At operation 355, the multi-class classification model used for selecting one or more candidate answers for an utterance is trained based on the obtained training data set.

Exemplary Electronic Devices

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 4A:
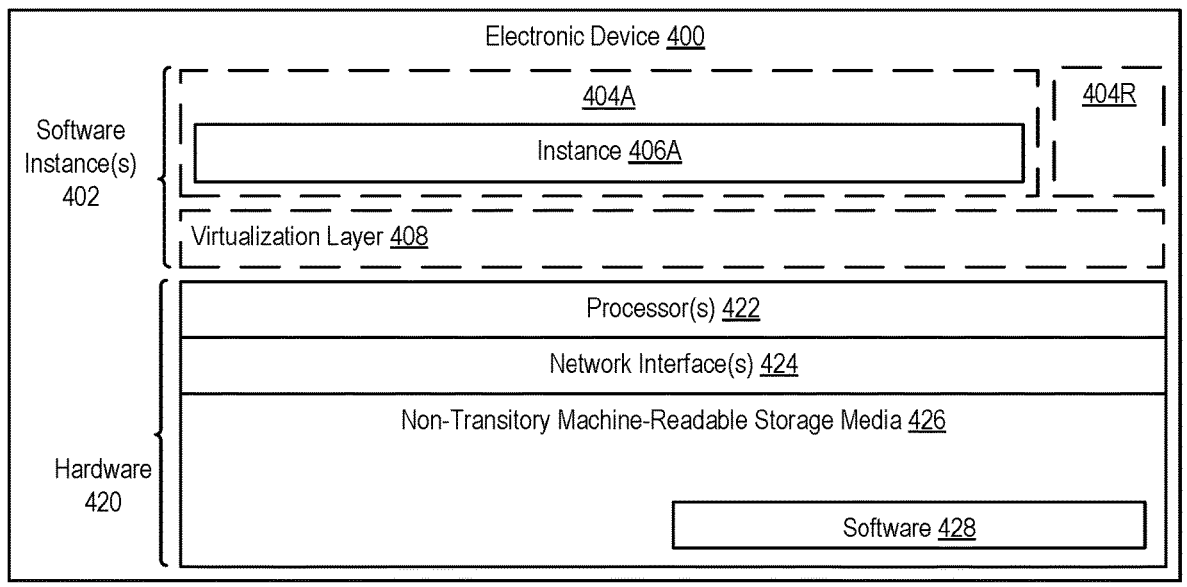
FIG. 4A is a block diagram illustrating an electronic device according to some example implementations.

FIG. 4A is a block diagram illustrating an electronic device 400 according to some example implementations. FIG. 4A includes hardware 420 comprising a set of one or more processor(s) 422, a set of one or more network interfaces 424 (wireless and/or wired), and non-transitory machine-readable storage media 426 having stored therein software 428 (which includes instructions executable by the set of one or more processor(s) 422). Each of the previously described end user clients and the FAQ answering service may be implemented in one or more electronic devices 400. In one implementation: 1) each of the end user clients is implemented in a separate one of the electronic devices 400 (e.g., in user electronic devices operated by users where the software 428 represents the software to implement end user clients to interface with the FAQ answering service (e.g., a web browser, a native client, a portal, a command-line interface, and/or an application program interface (API) based upon protocols such as Simple Object Access Protocol (SOAP), Representational State Transfer (REST), etc.)); 2) the FAQ answering service is implemented in a separate set of one or more of the electronic devices 400 (e.g., a set of one or more server electronic devices where the software 428 represents the software to implement the FAQ answering service); and 3) in operation, the electronic devices implementing the end user clients and the FAQ answering service would be communicatively coupled (e.g., by a network) and would establish between them (or through one or more other layers) connections for submitting utterance to the FAQ answering service and returning the answer to the end user clients. Other configurations of electronic devices may be used in other implementations (e.g., an implementation in which the end user client and the FAQ answering service are implemented on a single electronic device 400).

In electronic devices that use compute virtualization, the set of one or more processor(s) 422 typically execute software to instantiate a virtualization layer 408 and software container(s) 404A-R (e.g., with operating system-level virtualization, the virtualization layer 408 represents the kernel of an operating system (or a shim executing on a base operating system) that allows for the creation of multiple software containers 404A-R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 428 (illustrated as instance 406A) is executed within the software container 404A on the virtualization layer 408. In electronic devices where compute virtualization is not used, the instance 406A on top of a host operating system is executed on the "bare metal" electronic device 400. The instantiation of the instance 406A, as well as the virtualization layer 408 and software containers 404A-R if implemented, are collectively referred to as software instance(s) 402.

Alternative implementations of an electronic device may have numerous variations from that described above. For example, customized hardware and/or accelerators might also be used in an electronic device.

Exemplary Environment

Figure 4B:
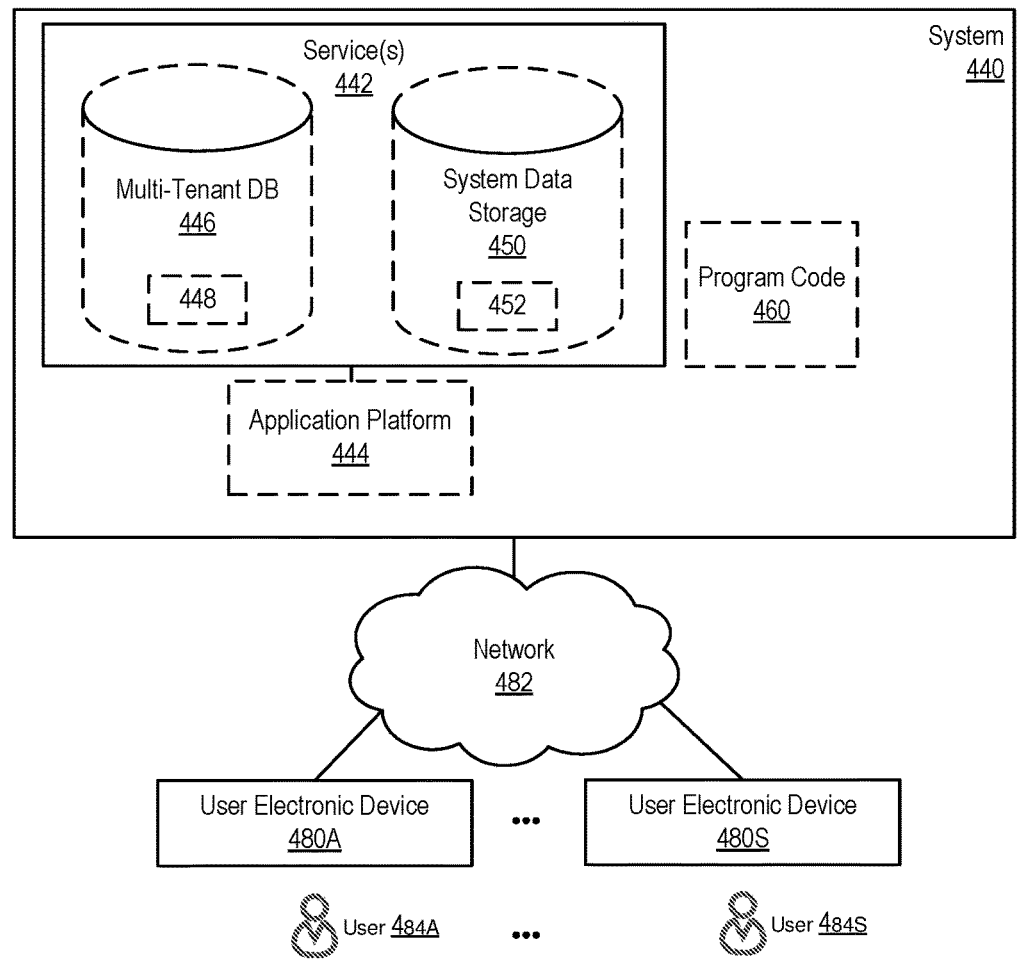
FIG. 4B is a block diagram of an environment where a FAQ answering system may be deployed, according to some implementations.

FIG. 4B is a block diagram of an environment where a FAQ answering system may be deployed, according to some implementations. A system 440 includes hardware (a set of one or more electronic devices) and software to provide service(s) 442, including the FAQ answering service. The system 440 is coupled to user electronic devices 480A-S over a network 482. The service(s) 442 may be on-demand services that are made available to one or more of the users 484A-S working for one or more other organizations (sometimes referred to as outside users) so that those organizations do not need to necessarily be concerned with building and/or maintaining a system, but instead makes use of the service(s) 442 when needed (e.g., on the demand of the users 484A-S). The service(s) 442 may communication with each other and/or with one or more of the user electronic devices 480A-S via one or more Application Programming Interface(s) (APIs) (e.g., a Representational State Transfer (REST) API). The user electronic devices 480A-S are operated by users 484A-S.

In one implementation, the system 440 is a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 440 may include an application platform 444 that enables PAAS for creating, managing, and executing one or more applications developed by the provider of the application platform 444, users accessing the system 440 via one or more of user electronic devices 480A-S, or third-party application developers accessing the system 440 via one or more of user electronic devices 480A-S.

In some implementations, one or more of the service(s) 442 may utilize one or more multi-tenant databases 446 for tenant data 448, as well as system data storage 450 for system data 452 accessible to system 440. In certain implementations, the system 440 includes a set of one or more servers that are running on server electronic devices and that are configured to handle requests for any authorized user associated with any tenant (there is no server affinity for a user and/or tenant to a specific server). The user electronic device 480A-S communicate with the server(s) of system 440 to request and update tenant-level data and system-level data hosted by system 440, and in response the system 440 (e.g., one or more servers in system 440) automatically may generate one or more Structured Query Language (SQL) statements (e.g., one or more SQL queries) that are designed to access the desired information from the one or more multi-tenant database 446 and/or system data storage 450.

In some implementations, the service(s) 442 are implemented using virtual applications dynamically created at run time responsive to queries from the user electronic devices 480A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 460 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 444 includes an application setup mechanism that supports application developers' creation and management of applications, which may be saved as metadata by save routines. Invocations to such applications, including the FAQ answering service, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 482 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 440 and the user electronic devices 480A-S.

Each user electronic device 480A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 440. For example, the user interface device can be used to access data and applications hosted by system 440, and to perform searches on stored data, and otherwise allow a user 484 to interact with various GUI pages that may be presented to a user 484. User electronic devices 480A-S might communicate with system 440 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 480A-S might include an HTTP client, commonly referred to as a "browser," for sending and receiving HTTP messages to and from server(s) of system 440, thus allowing users 484 of the user electronic device 480A-S to access, process, and view information, pages, and applications available to it from system 440 over network 482.

CONCLUSION

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method performed by an answering system implemented using an electronic device, the method comprising:
   receiving an utterance representative of a question from a user;
   determining a decision score for the utterance that is indicative of the likelihood that the utterance is answerable according to a set of frequently asked questions and answers, wherein the determining the decision score includes:
   determining a plurality of similarity scores for the utterance and the questions from the frequently asked questions and answers,
   selecting a similarity score from the plurality of similarity scores for the utterance, wherein the similarity score is indicative of a question from the set of frequently asked questions and answers satisfying a similarity criterion with the utterance, and
   converting the similarity score into the decision score;
   determining for the utterance a candidate answer from the set of frequently asked questions and answers and a selection score for the candidate answer according to a multi-class classification model that includes the answers from the set of frequently asked questions and answers as classification classes;
   determining, based on the decision score and the selection score, a total score for the candidate answer and the utterance, wherein the total score is indicative of the likelihood that the candidate answer is a correct answer for the utterance according to the set of frequently asked questions and answers; and
   outputting the candidate answer as an answer to the question from the user in response to determining that the total score satisfies a threshold.

2. The method of claim 1, wherein the determining for the utterance the candidate answer from the associated answers and the selection score for the candidate answer is based on an assumption that the question from the user is answerable according to the set of frequently asked questions and answers.

3. The method of claim 1, wherein the multi-class classification model is trained based on a training data set that includes noisy versions of the questions and noisy versions of the answers from the set of frequently asked questions and answers.

4. The method of claim 1, wherein the determining the total score for the candidate answer and the utterance includes:
   multiplying the decision score with the selection score.

5. The method of claim 1 further comprising:
   outputting the candidate answer as an answer to the question from the user and the total score as an indication of the likelihood that the candidate answer is the correct answer for the question.

6. A non-transitory machine-readable storage medium that provides instructions that, if executed by a processor, will cause said processor to perform operations comprising:
   receiving an utterance representative of a question from a user;
   determining a decision score for the utterance that is indicative of the likelihood that the utterance is answerable according to a set of frequently asked questions and answers, wherein the determining the decision score includes:
   determining a plurality of similarity scores for the utterance and the questions from the frequently asked questions and answers, selecting a similarity score from the plurality of similarity scores for the utterance, wherein the similarity score is indicative of a question from the set of frequently asked questions and answers satisfying a similarity criterion with the utterance, and
converting the similarity score into the decision score;
determining for the utterance a candidate answer from the set of frequently asked questions and answers and a selection score for the candidate answer according to a multi-class classification model that includes the answers from the set of frequently asked questions and answers as classification classes;
determining, based on the decision score and the selection score, a total score for the candidate answer and the utterance, wherein the total score is indicative of the likelihood that the candidate answer is a correct answer for the utterance according to the set of frequently asked questions and answers; and
outputting the candidate answer as an answer to the question from the user in response to determining that the total score satisfies a threshold.

7. The non-transitory machine-readable storage medium of claim 6, wherein the determining for the utterance the candidate answer from the associated answers and the selection score for the candidate answer is based on an assumption that the question from the user is answerable according to the set of frequently asked questions and answers.

8. The non-transitory machine-readable storage medium of claim 6, wherein the multi-class classification model is trained based on a training data set that includes noisy versions of the questions and noisy versions of the answers from the set of frequently asked questions and answers.

9. The non-transitory machine-readable storage medium of claim 6, wherein the determining the total score for the candidate answer and the utterance includes:
multiplying the decision score with the selection score.

10. The non-transitory machine-readable storage medium of claim 6, wherein the operations further comprise:
outputting the candidate answer as an answer to the question from the user and the total score as an indication of the likelihood that the candidate answer is the correct answer for the question.

11. An electronic device comprising:
a non-transitory machine-readable storage medium that provides instructions that, if executed by a processor in the electronic device, will cause the electronic device to perform operations comprising,
receiving an utterance representative of a question from a user;
determining a decision score for the utterance that is indicative of the likelihood that the utterance is answerable according to a set of frequently asked questions and answers, wherein the determining the decision score includes:
determining a plurality of similarity scores for the utterance and the questions from the frequently asked questions and answers,
selecting a similarity score from the plurality of similarity scores for the utterance, wherein the similarity score is indicative of a question from the set of frequently asked questions and answers satisfying a similarity criterion with the utterance, and
converting the similarity score into the decision score;
determining for the utterance a candidate answer from the set of frequently asked questions and answers and a selection score for the candidate answer according to a multi-class classification model that includes the answers from the set of frequently asked questions and answers as classification classes;
determining, based on the decision score and the selection score, a total score for the candidate answer and the utterance, wherein the total score is indicative of the likelihood that the candidate answer is a correct answer for the utterance according to the set of frequently asked questions and answers; and
outputting the candidate answer as an answer to the question from the user in response to determining that the total score satisfies a threshold.

12. The electronic device of claim 11, wherein the determining for the utterance the candidate answer from the associated answers and the selection score for the candidate answer is based on an assumption that the question from the user is answerable according to the set of frequently asked questions and answers.

13. The electronic device of claim 11, wherein the multi-class classification model is trained based on a training data set that includes noisy versions of the questions and noisy versions of the answers from the set of frequently asked questions and answers.

14. The electronic device of claim 11, wherein the determining the total score for the candidate answer and the utterance includes:
multiplying the decision score with the selection score.

15. The electronic device of claim 11, wherein the operations further comprise:
outputting the candidate answer as an answer to the question from the user and the total score as an indication of the likelihood that the candidate answer is the correct answer for the question.

* * * * *